US009537798B1

(12) United States Patent
Devilbiss et al.

(10) Patent No.: US 9,537,798 B1
(45) Date of Patent: Jan. 3, 2017

(54) ETHERNET LINK AGGREGATION WITH SHARED PHYSICAL PORTS

(71) Applicant: International Business Machines Corporation, Armonk, NY (US)

(72) Inventors: Colin R. Devilbiss, Rochester, MN (US); Charles S. Graham, Rochester, MN (US); Timothy J. Schimke, Stewartville, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/000,352

(22) Filed: Jan. 19, 2016

(51) Int. Cl.
| | | |
|---|---|---|
| H04L 12/28 | (2006.01) | |
| H04L 12/931 | (2013.01) | |
| H04L 12/18 | (2006.01) | |
| H04L 12/935 | (2013.01) | |
| H04L 12/709 | (2013.01) | |
| H04L 12/721 | (2013.01) | |

(52) U.S. Cl.
CPC ............... *H04L 49/70* (2013.01); *H04L 12/18* (2013.01); *H04L 45/245* (2013.01); *H04L 45/66* (2013.01); *H04L 49/30* (2013.01)

(58) Field of Classification Search
None
See application file for complete search history.

(56) References Cited

U.S. PATENT DOCUMENTS

| | | | |
|---|---|---|---|
| 6,195,351 B1 | 2/2001 | Hiscock et al. | |
| 6,385,197 B1 | 5/2002 | Sugihara | |
| 7,173,934 B2 | 2/2007 | Lapuh et al. | |
| 7,274,694 B1 | 9/2007 | Cheng et al. | |
| 7,697,525 B2 | 4/2010 | Zelig et al. | |
| 2002/0103921 A1 | 8/2002 | Nair et al. | |
| 2007/0268903 A1 | 11/2007 | Nakagawa | |
| 2008/0273456 A1* | 11/2008 | Messing | H04L 49/557 370/219 |
| 2010/0232443 A1* | 9/2010 | Pandey | H04L 49/10 370/401 |
| 2014/0307553 A1* | 10/2014 | Fung | H04L 47/125 370/235 |
| 2015/0003459 A1 | 1/2015 | Narasimhan | |
| 2015/0244542 A1 | 8/2015 | Finn | |

* cited by examiner

*Primary Examiner* — Anh Ngoc Nguyen
(74) *Attorney, Agent, or Firm* — Patterson + Sheridan, LLP

(57) ABSTRACT

Techniques are disclosed for providing Ethernet link aggregation over physical ports shared by logically independent entities. An aggregation manager receives a frame at a first logical port that receives frames targeted to at least a second logical port. A client operating system receives the frame at the second logical port. The aggregation manager determines whether the second logical port received the frame. Upon determining that the second logical port did not receive the frame, the aggregation manager forwards the frame to the client OS via a sideband interface associated with the client OS.

20 Claims, 7 Drawing Sheets

ETHERNET LINK AGGREGATION WITH
SHARED PHYSICAL PORTS

BACKGROUND

Embodiments presented herein generally relate to Ethernet link aggregation, and more specifically, to providing link aggregation over multiple logical Ethernet ports.

Generally, link aggregation bonds multiple physical network interface ports of a network device, such as a switch, to a single logical port. When bonded, a link aggregate (i.e., the multiple network interfaces) appears to link partners (e.g., a host computer and a switch) as a single network interface. For example, the link aggregate is associated with its own Media Access Control (MAC) address mapped to each linked physical network interface. Link aggregation provides increased throughput, redundancy, fault tolerance, and load balancing in a computer network, such as in a cloud computing environment.

Currently, link aggregation techniques also allow multiple logical ports to be bonded with one another, i.e., share a single physical network interface port. For example, such techniques may be adapted in a single-root I/O virtualization (SR-IOV) architecture. In an SR-IOV architecture, a PCIe device, such as a network adapter, can separate access to resources using physical functions (PFs) and virtual functions (VFs), which allow the network adapter to appear to be multiple distinct network adapters. As a result, an SR-IOV architecture may allow logically independent entities, e.g., virtual machines executing on a given host, to share a physical link with one another. For example, a virtual machine may create, via SR-IOV, multiple logical ports from different physical ports of a network adapter and bond the logical ports together using link aggregation. Another virtual machine on the host may similarly aggregate logical ports using such methods.

However, aggregating logical ports may cause issues with the link partner that has the physical ports, usually a switch. For instance, the switch is generally unaware of any logical ports beyond one on a given physical port. For example, assume that a virtual machine X, assigns a logical port A to a first physical port, assigns a logical port B to a second physical port, and creates a link aggregate AB from the logical ports. Further, assume that a virtual machine Y assigns a logical port C to the first physical port, assigns a logical port D to the second physical port, and creates a link aggregate CD from the logical ports. Also assume that the switch aggregates the first and second physical ports. In such a case, the aggregation scheme operates normally, provided that all logical ports are active (or if logical ports A and B are both down, or if logical ports C and D are both down). However, if a single logical port goes offline, the switch may be unable to deliver a given frame to its intended destination. Continuing the previous example, assume that logical port D becomes inactive. In such a case, the switch would not recognize that frames targeted towards logical aggregate CD need to be sent to only the first physical port. That is, frames sent to the second physical port will only be received at logical port B, and thus not by virtual machine Y.

SUMMARY

One embodiment presented herein discloses a method for providing Ethernet link aggregation for logically independent entities that share a plurality of physical ports. The method generally includes receiving a frame at a first logical port that receives frames targeted to at least a second logical port. The second logical port is associated with a client operating system (OS). The first and second logical ports are assigned to a physical port of a network adapter. The method also generally includes determining whether the second logical port received the frame. Upon determining that the second logical port did not receive the frame, the frame is forwarded to the client OS via a sideband interface associated with the client OS.

Another embodiment presented herein discloses a computer program product that has a non-transitory computer-readable storage medium storing instructions, which, when executed on a processor, perform an operation for providing Ethernet link aggregation for logically independent entities that share a plurality of physical ports. The operation itself generally includes receiving a frame at a first logical port that receives frames targeted to at least a second logical port. The second logical port is associated with a client operating system (OS). The first and second logical ports are assigned to a physical port of a network adapter. The operation also generally includes determining whether the second logical port received the frame. Upon determining that the second logical port did not receive the frame, the frame is forwarded to the client OS via a sideband interface associated with the client OS.

Yet another embodiment presented herein discloses a system comprising a processor, a network adapter, and a memory. The memory stores code, which, when executed on the processor, performs an operation for providing Ethernet link aggregation for logically independent entities that share a plurality of physical ports. The operation itself generally includes receiving a frame at a first logical port that receives frames targeted to at least a second logical port. The second logical port is associated with a client operating system (OS). The first and second logical ports are assigned to a physical port of a network adapter. The operation also generally includes determining whether the second logical port received the frame. Upon determining that the second logical port did not receive the frame, the frame is forwarded to the client OS via a sideband interface associated with the client OS.

BRIEF DESCRIPTION OF THE SEVERAL
VIEWS OF THE DRAWINGS

FIG. 1 illustrates an example computing environment, according to one embodiment.

FIG. 2 further illustrates the computing system described relative to FIG. 1, according to one embodiment.

DETAILED DESCRIPTION

Figure 1:
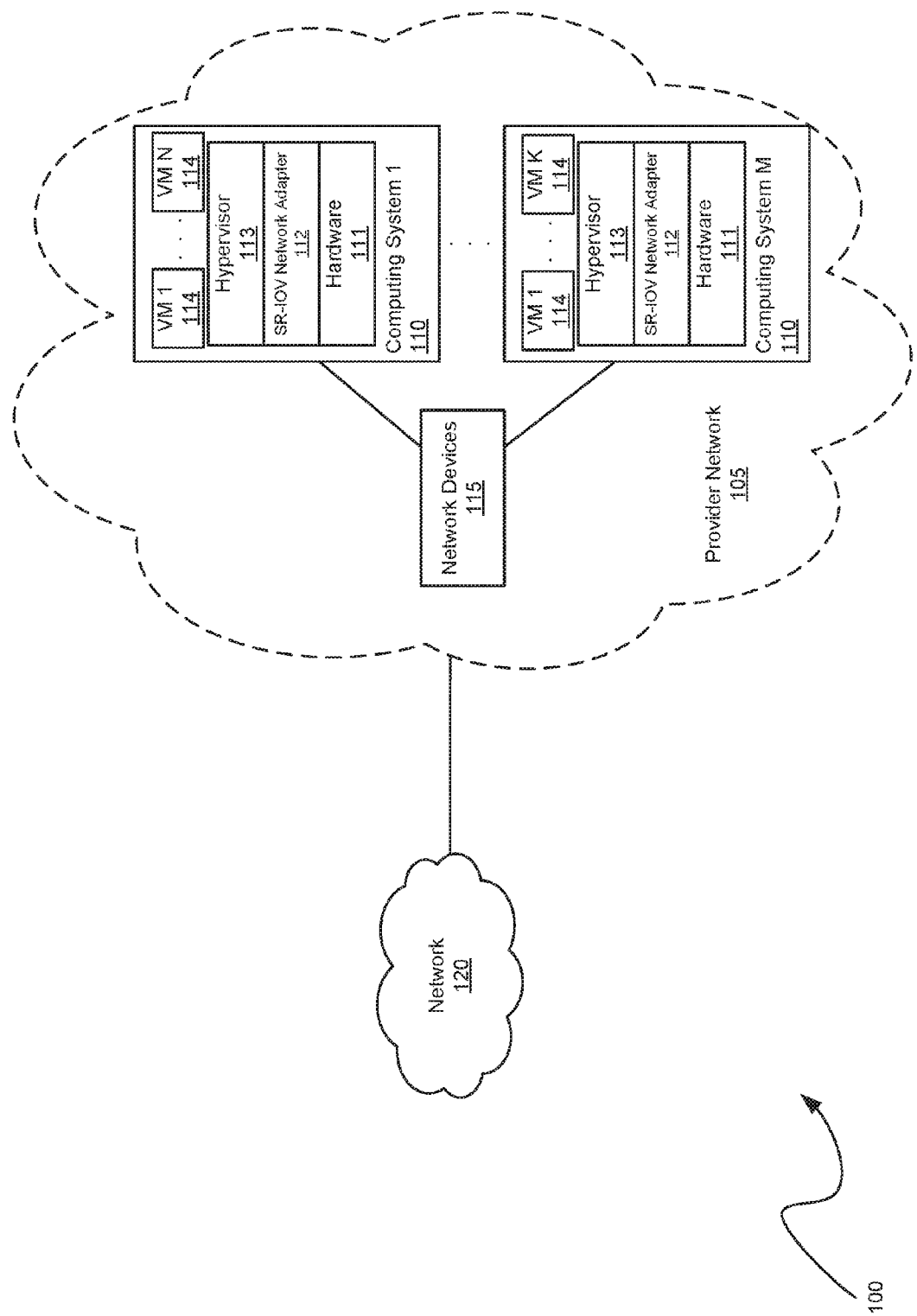

Embodiments presented herein describe techniques for aggregating multiple logical Ethernet ports across physical ports of a network adapter that are shared among different entities. More specifically, embodiments provide a link aggregation manager executing in a firmware of a host computer system (e.g., a hypervisor residing in the system). In one embodiment, the link aggregation manager handles frames received from the switch that are directed to an inactive logical port. The link aggregation manager may then forward these frames to the intended target, e.g., a virtual machine (VM) instance executing in the system.

For example, techniques are adaptable in a single-root I/O virtualization (SR-IOV) architecture. As described above, SR-IOV allows PCIe devices of a host computing system to separate access to resources into physical functions (PFs) and (VFs) that can be mapped to logically independent entities (e.g. VMs executing on the computing system), as if each entity had its own distinct PCIe device. For instance, an SR-IOV adapter may interface with a network adapter and create VFs for port functionality that VMs can use for transferring data over a network. Doing so allows the VMs to communicate directly with the underlying network adapter, bypassing intermediate communications with a hypervisor.

In addition, a VM may generate logical ports to communicate with individual physical network interface ports of the adapter. Further, the VM may bond the logical ports using various techniques, e.g., static link aggregation, etc., to create an aggregate that effectively causes the logical ports to appear as a single network interface port. In a given host computing system, multiple VMs may take advantage of link aggregation techniques to bond logical ports though an SR-IOV adapter.

However, the switch is generally unaware of an aggregate in the SR-IOV architecture. Thus, if a logical port associated with a given VM fails, then the switch may still direct an incoming frame towards the physical port associated with that logical port, which potentially results in the VM not receiving the frame. Therefore, an approach that allows the traffic to be rerouted to working ports (so that the VM receives the frame) is desirable.

In one embodiment, a firmware layer of the host computing system, such as the hypervisor, includes the aggregation manager. Further, the hypervisor also creates an SR-IOV promiscuous port used to receive all frames targeted to a given logical link aggregate. Further still, a client OS in each VM instance registers a sideband channel that allows the client OS to receive frames from the aggregation manager. In addition, the aggregation manager tracks frames addressed to each logical aggregate via the promiscuous port associated with the logical aggregate, e.g., using corresponding media access control (MAC) addresses. In the event that all logical ports are operational, the current link aggregates function as normal. That is—the switch delivers each frame to an intended logical port.

However, in the event that one of the logical ports becomes inactive (i.e., not in a live operational state), the promiscuous logical port associated with the corresponding link aggregate receives the frame. The aggregation manager then determines which link aggregate should have received the frame. For example, the aggregation manager may evaluate the destination MAC address specified in the frame to identify the aggregate. Once identified, the aggregation manager may forward the frame to the intended destination via the sideband channels.

In other cases, the switch may forward multicast or broadcast frames from a given port to corresponding SR-IOV logical ports. In one embodiment, the aggregation manager forwards the multicast frames to the sideband channels of the VMs intended to receive the multicast frame. The client OS of the VM, in turn, can determine whether the frame has already been received at the SR-IOV logical port. For example, the client OS can determine, based on the timestamp of the frame, whether the frame was received during a period in which the intended logical port recipient was inactive. If so, the client OS can process the frame. Otherwise, the client OS drops the frame. Because the logical ports generally may receive multicast frames at a less frequent rate than unicast frames, causing the client OS to determine whether it has received a multicast frame at the intended port would not place a significant burden on system resources (e.g., compared to the aggregation manager determining whether each intended logical port recipient is active when the frame is received).

Advantageously, the techniques described herein provide link aggregation over physical ports shared by logically independent entities (e.g., virtual machines, logical partitions, etc.). By modifying a system firmware to include an entity (i.e., the aggregation manager) that handles incoming frames and forwards the frames through sideband channels (e.g., a virtual switch interface) to an intended destination, network frames can be delivered to the intended destination even in the event of failure of a given logical port. Further, under such an approach, because the frame forwarding is handled by sideband channels in the system firmware and client operating system instances, no modification to a link partner (e.g., a network switch) is unnecessary.

Note, the following uses single-root I/O virtualization (SR-IOV) as a reference example of an architecture that allows a virtualized computing instance to generate logical ports and provide link aggregation over those ports using an intermediary aggregation manager and sideband channels. However, one of skill in the art will recognize that embodiments presented herein may be adapted to various environments where a computing system (whether a physical computing system or a virtualized computing instance) bonds multiple virtual ports to create a logical aggregate.

FIG. 1 illustrates an example computing environment 100, according to one embodiment. As shown, the computing environment 100 includes a provider network 105 that is interconnected with a network 120. In one embodiment, the network 120 is the Internet. The provider network 105 includes one or more computing systems 1-M 110, each interconnected with network devices 115. Further, each computing system 110 includes hardware 111, a single-root I/O virtualization-enabled (SR-IOV) network adapter 112, a hypervisor 113, and one or more virtual machines (VMs) 1-N (1-K) 114. In one embodiment, the provider network 105 represents a cloud provider environment, where each computing system 110 provides sharable physical resources (e.g., processing, storage capacity, network functionality, etc.) for a user base.

For instance, each computing system 110 may spawn, using the hypervisor 113, a number of VMs 114 that can belong to a number of independent entities (e.g., enterprises, organizations, individual users, etc.). The hypervisor 113 represents computer firmware for the computing system 110 that manages the execution of the VMs 114, e.g., by managing physical resource allocation, accessing physical resources on behalf of a given VM 114, etc.

The SR-IOV network adapter 112 provides an interface between the computing system 110 and the network devices 115. In one embodiment, the SR-IOV network adapter 112 provides physical functions (PFs) and virtual functions (VFs) consistent with SR-IOV standards. PFs include full-featured PCIe device functions that provide a full configuration space for the SR-IOV network adapter 112. PFs may configure and control the SR-IOV network adapter 112 (e.g., exposing VFs to VMs), as well as move data in and out of the SR-boy network adapter 112. VFs are lightweight PCIe functions that represent a virtualized instance of the SR-IOV network adapter 112. Each VF shares one or more physical resources on the SR-IOV network adapter 112 with other PFs and VFs, such as network ports of the adapter.

Through VF instances of the SR-IOV network adapter 112, the VMs 114 may access physical resources of the network adapter 112 such that each VM 114 appears to have its own distinct network adapter. As a result, the VM 114 can perform actions to the physical network adapter via the VF instance. For example, the hypervisor 113 may generate logical ports from the physical ports of the SR-IOV network adapter 112 and assign one or more of the logical ports to a given VM 114. In addition, the VM 114 may, using link aggregation techniques (e.g., static aggregation, etc.), bond the logical ports together, such that the logical ports appear as a single port.

In one embodiment, the network devices 115 may include a network switch that connects the computing systems 110 with one another in the provider network 105 via physical ports of the switch and of a network adapter 112. Such a network device 115 is configured to support link aggregation standards, such as static link aggregation, with the computing systems 110. Such standards allow the network device 115 to communicate properly with physical link aggregates in the computing system 110. However, the network device 115 is generally unaware of aggregates of logical ports created by the VMs. That is, although the network device 115 may still direct network frames addressed to a given logical link aggregate associated with a given physical port, the network device 115 is typically only aware of a first logical port associated with the physical link in the aggregate (i.e., and no other logical ports that may be associated with the aggregate). As a result, in the event that a logical port becomes inactive (e.g., due to error handling mechanisms that force the logical port to temporarily go offline), network frames that are received at a physical port (that is associated with the inactive logical port) might not reach the intended VM 114.

Figure 2:
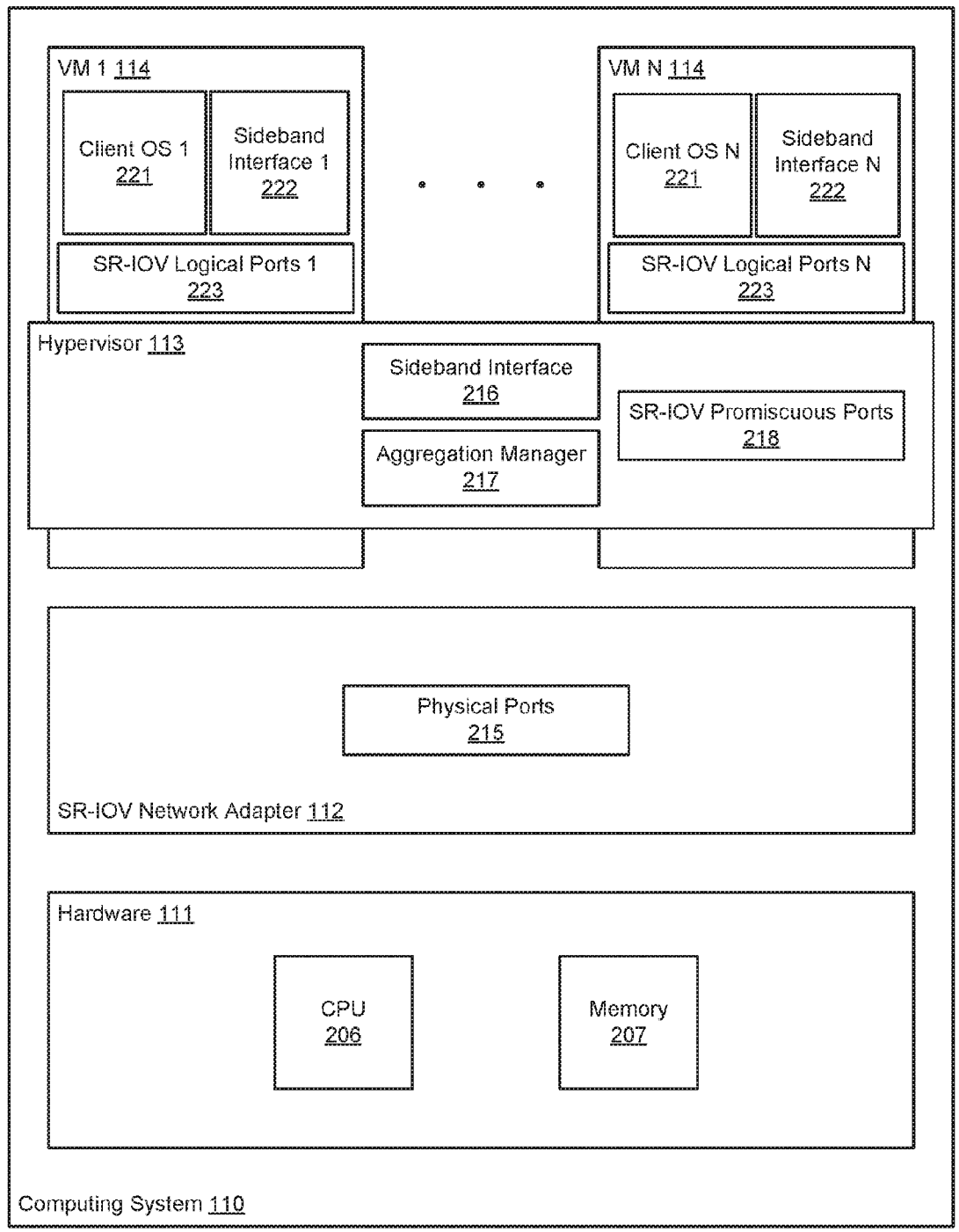

To address this issue, each computing system 110 is configured with an entity that forwards frames addressed to a non-logical port to the appropriate logical aggregate through a working channel. FIG. 2 further illustrates an example computing system 110 configured to provide link aggregation with physical ports shared by multiple independent entities, according to one embodiment. As shown, the hardware 111 includes a central processing unit 206 and a memory 207. The SR-IOV network adapter 112 includes one or more physical ports 215. In addition, the hypervisor 113 includes a sideband interface 216, an aggregation manager, and SR-IOV promiscuous ports 218. Each VM 1-N 114 includes a respective client operating system (OS) 221, sideband interface 222, and one or more SR-IOV logical ports 223. As stated above, the SR-IOV network adapter 112 allows multiple independent entities, e.g., VMs 114, to access shared physical resources of the network adapter 112, such as physical ports 215.

The CPU 206 is representative of a single CPU, multiple CPUs, a single CPU having multiple processing cores, and the like. Similarly, memory 207 may be a random access memory. While the memory 207 is shown as a single identity, it should be understood that the memory 207 may comprise a plurality of modules, and that the memory 207 may exist at multiple levels, from high speed registers and caches to lower speed but larger DRAM chips.

The hypervisor 113 supports multiple virtual machine execution spaces, where a VM process can be executed to instantiate corresponding VMs 114. For each VM 114, the hypervisor 113 manages a corresponding virtual hardware platform that includes emulated hardware, such as virtual CPUs and memory. In addition, the hypervisor 113 may generate and assign one or more logical ports 223 from physical ports 215 to each VM 114. Each logical port 223 may be associated with a given physical port 215 on the SR-IOV network adapter 112. In each VM 114, the corresponding client OS 221 provides user-level applications running in the virtual machine. Further, the VM 114 may aggregate its logical ports (e.g., using techniques such as static aggregation or LACP) to provide fault tolerance and load balancing support for network connections of the VM 114.

In one embodiment, to ensure that network frames targeted to a given destination VM 114 is received by the VM when a logical port of a link aggregate becomes inactive, the hypervisor 113 includes an aggregation manager 217 and one or more SR-IOV promiscuous ports 218, where each SR-IOV promiscuous port 218 receives network frames from an associated physical port 215. Further, the hypervisor 113 registers sideband interfaces 216 in the hypervisor 113 and VMs 114 for transmitting frames to VMs 114. The sideband interfaces 216 and 223 may be a MAC-aware Ethernet switch executing in the hypervisor 113 (e.g., a virtual Ethernet switch).

The SR-IOV network adapter 112 processes outgoing frames sent by each logical aggregate functions as normal, i.e., according to the link aggregation protocol. Further, in the absence of failure of any of the logical ports of each aggregate, the SR-IOV network adapter 112 also processes incoming frames as normal. That is, incoming unicast and multicast frames are received at the targeted logical ports. In one embodiment, the aggregation manager 217 may periodically check the liveness of each logical port associated with each VM 114. Doing so allows the aggregation manager 217 to enable or disable a given SR-IOV promiscuous port 218 based on the liveness of an associated logical port.

In the event that one of the logical ports associated with a link aggregate is inactive and the network adapter 112 receives a unicast frame directed at that port, the SR-IOV network adapter 112 forwards the frame to the SR-IOV promiscuous port 218 associated with the aggregate. The aggregation manager 217 may evaluate the destination MAC address of the unicast frame, which may specify the MAC address shared by logical ports in the link aggregate. Identifying the MAC address allows the aggregation manager 217 to deliver the frame to the underlying VM 114 using the sideband interfaces 216 and corresponding sideband interface 223.

Further, in one embodiment, the aggregation manager 217 may automatically forward a given multicast frame received at a SR-IOV promiscuous port 218 to a sideband interface 223 of each VM 114 associated with the multicast address specified in the frame. The client OS 221 of a recipient VM 114 can then determine whether the logical port that should have received that frame was inactive at the time the frame was forwarded by the network device 115. If so, then the client OS 221 drops the frame, as the frame was likely already received. Otherwise, because the logical port was inactive at the time the frame was forwarded, the VM 114 likely did not receive the frame. In such a case, the client OS 221 can process the multicast frame.

Figure 3A:
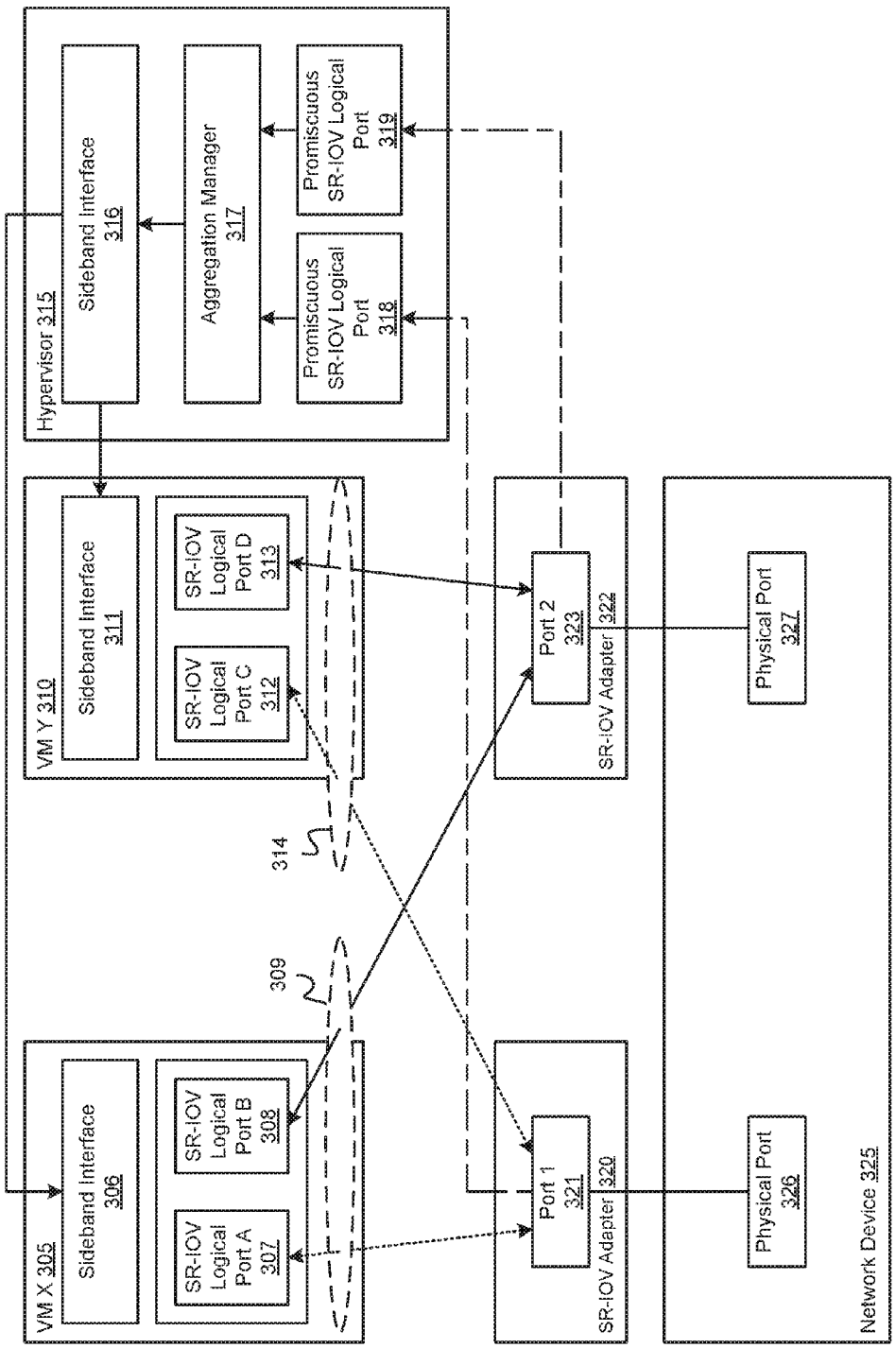
FIGS. 3A and 3B illustrate an example for providing link aggregation over multiple logical Ethernet ports.

FIG. 3A illustrates an example for providing link aggregation over multiple logical Ethernet ports. In particular, FIG. 3A depicts an example of a provider network in a live operational state. As shown, FIG. 3A includes a VM X 305, a VM Y 310, a hypervisor 315, an SR-IOV adapter 320, an SR-IOV adapter 322, which are representative of physical and virtual components of a host computing system. FIG. 3A also includes a network device 325, representative of an Ethernet switch. SR-IOV adapters 320 and 322 represent VF instances of an underlying SR-IOV network adapter of the computing system that are capable of communicating with VMs X 305 and Y 310. SR-IOV adapter 320 includes port 1 321, and SR-IOV adapter 322 includes a port 2 323. Port 1 321 connects with a physical port 326 in the network device 325, and port 2 connects with a physical port 327 in the network device 325.

Illustratively, the hypervisor 315 includes a sideband interface 316, an aggregation manager 317, promiscuous SR-IOV logical ports 318 and 319. Further, the VM X 305 includes a sideband interface 306 and SR-IOV logical ports A 307 and B 308. The logical port A 307 is assigned to port 1 321, and the logical port B 308 is assigned to the port 2 323. Further, the logical ports A 307 and B 308 are bonded as aggregate 309. The VM Y includes a sideband interface 311 and SR-IOV logical ports C 312 and D 313. The logical port C 312 is assigned to port 2 323, and the logical port D 313 is assigned to port 1 321. And the logical ports C 312 and D 313 are bonded as aggregate 314. Further still, illustratively, the promiscuous SR-IOV logical port 318 is assigned to port 1 321, and the promiscuous SR-IOV logical port 319 is assigned to port 2 323.

In one embodiment, the aggregation manager 317 may evaluate liveness (i.e., a live operational state) of each of the SR-IOV logical ports A 307, B 308, C 312, and D 313. If all are operational, unicast frames targeted toward either aggregate 309 or 314 will be received at the appropriate logical port according to the configured link aggregation protocol. For example, if a unicast frame targeted at aggregate 309 is received at port 2 323, the SR-IOV adapter 322 directs the unicast frame to SR-IOV logical port B 308. As another example, if a multicast frame is sent to both aggregates 309 and 314 at port 2 323, the multicast frame is received at logical ports B 308 and D 313.

Figure 3B:
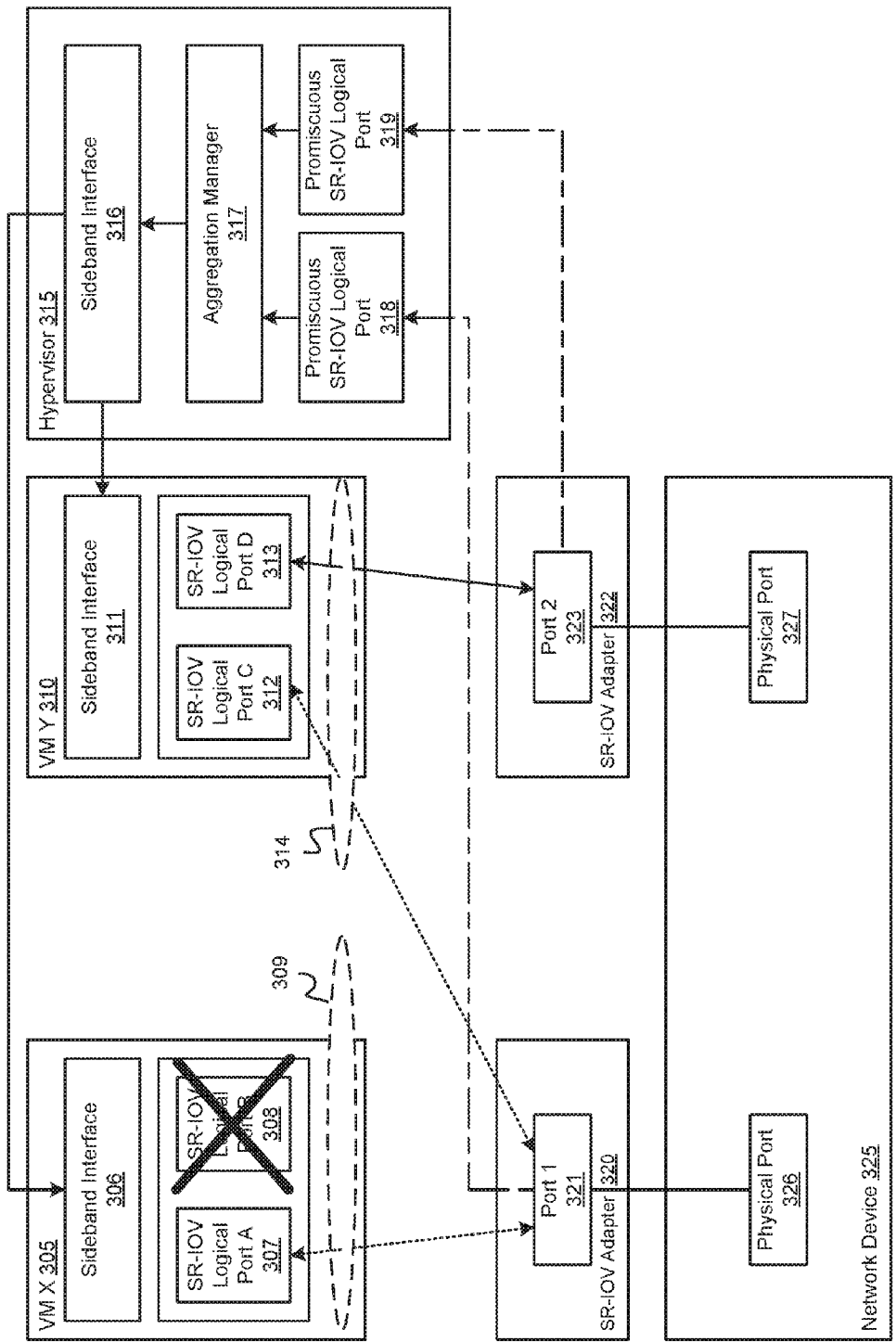

As stated, a logical port in a VM can become inactive for a variety of reasons. For example, PCIe-level failures in the underlying SR-IOV network adapter may trigger error-handling measures that require a given logical adapter to go offline. FIG. 3B depicts a scenario in which the SR-IOV logical port B 308 becomes inactive. Illustratively, the SR-IOV logical port B 308 is marked as inactive, and no traffic flows to or from the logical port B 308. In such an event, the aggregation manager 317 may enable the associated promiscuous SR-IOV logical port 319 to receive all frames sent to port 2 323. As a result, when unicast frames directed to aggregate 309 are received at port 2 323, the promiscuous SR-IOV logical port 319 receives the frame. Doing so allows the aggregation manager 317 to evaluate the frame to determine the intended recipient link aggregate based on the destination MAC address specified in the frame. The aggregation manager 317 can then forward the frame to the logical port B 308 via the sideband interfaces 316 and 306.

Figure 4:
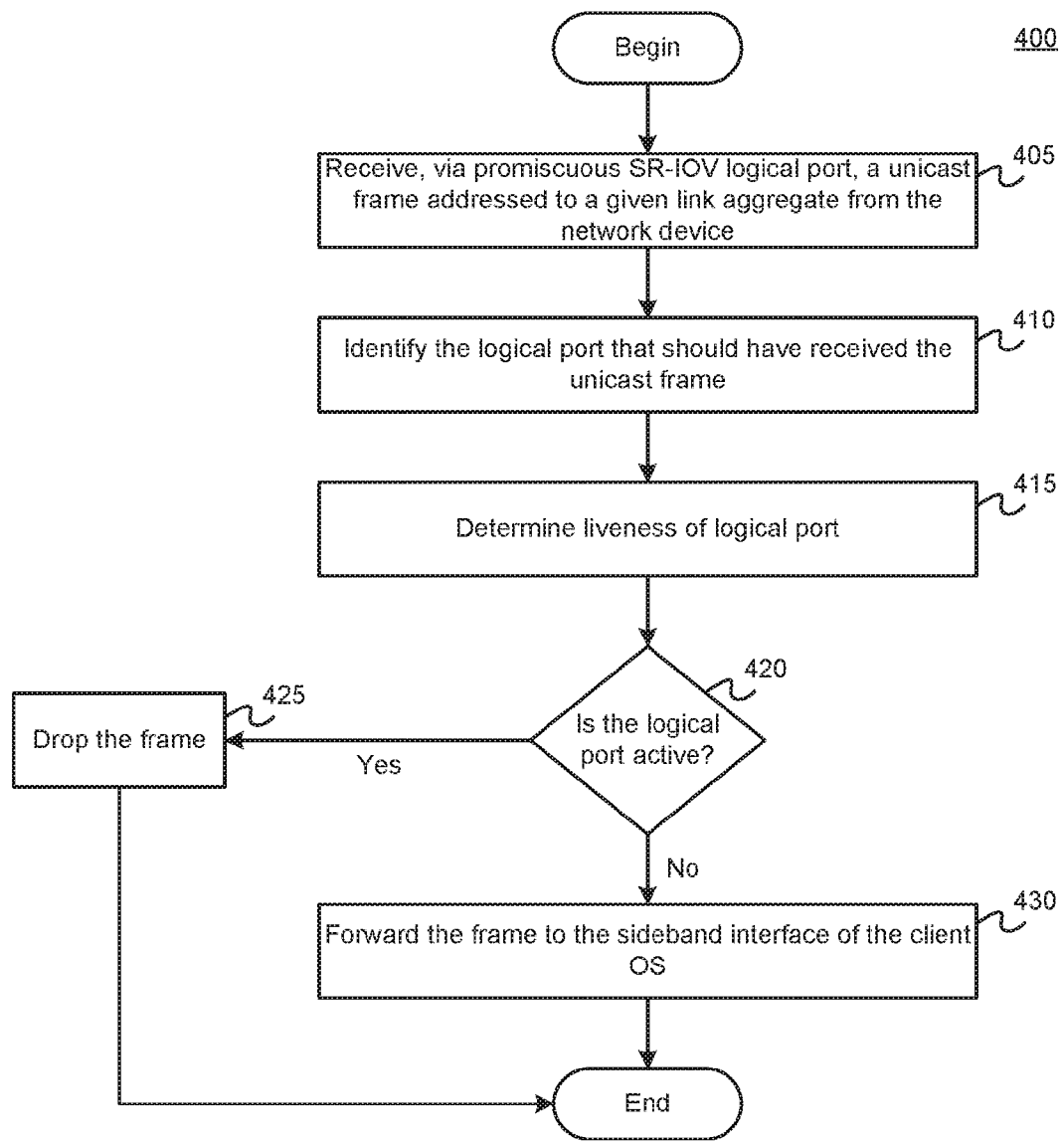
FIG. 4 illustrates a method for forwarding unicast frames to a link aggregate of multiple logical ports, according to one embodiment.

FIG. 4 illustrates a method 400 for forwarding unicast frames to a link aggregate of multiple logical ports, according to one embodiment. Method 400 will be described using the example scenario illustrated in FIG. 3B, where the SR-IOV logical port B 308 is currently inactive. As shown, method 400 begins at step 405, where a unicast frame that is addressed to a given link aggregate is received via an associated promiscuous SR-IOV logical port in the hypervisor. In this example, the unicast frame can be received at port 2 323, and therefore, forwarded to promiscuous SR-IOV logical port 319.

At step 410, the aggregation manager 317 identifies the logical port that should have received the frame. To do so, the aggregation manager 317 can determine the target link aggregate based on the destination MAC address specified in the frame. Once determined, the aggregation manager 317 can identify the VM, client OS, and logical port that should have received the frame.

At step 415, the aggregation manager 317 determines the liveness of the identified logical port. As stated, the aggregation manager 317 may periodically evaluate the liveness of each logical port managed by VMs executing in the host computing system. At step 420, the aggregation manager 317 determines whether the logical port is currently active based on the liveness information. If the logical port is currently active, then at step 425, the aggregation manager 317 drops the frame, because the targeted SR-IOV logical port received the frame. For example, assume that the frame indicates that the destination MAC address corresponds to link aggregate 415, and thus, should have been received at SR-IOV logical port D 313. Because the logical port D 313 is active, the port should have already received the frame. As a result, the aggregation manager 317 drops the frame.

Otherwise, if the logical port is inactive, then the aggregation manager 317 forwards the frame to the client OS associated with the inactive logical port. For example, assume that the frame indicates that the destination MAC address corresponds to link aggregate 309. In such a case, the frame should have been received at SR-IOV logical port B 308. Because the SR-IOV logical port B is inactive, the aggregation manager 317 forwards the frame to the client OS though sideband interfaces 316 and 306. The client OS then receives and processes the frame.

In an alternative approach, a promiscuous SR-IOV logical port receiving a unicast frame can indicate that a SR-IOV logical port associated with the promiscuous port was inactive. In such a case, the aggregation manager determines the appropriate recipient of the unicast frame and forwards the frame to the recipient via the sideband interface (without having to perform the step of determining whether the logical port is active). Further, in another approach, the sideband interface (e.g., a virtual switch) may include Ethernet MAC routing logic that allows the frame to be forwarded directly to the recipient (i.e., without having to perform steps of identifying the intended recipient).

Figure 5:
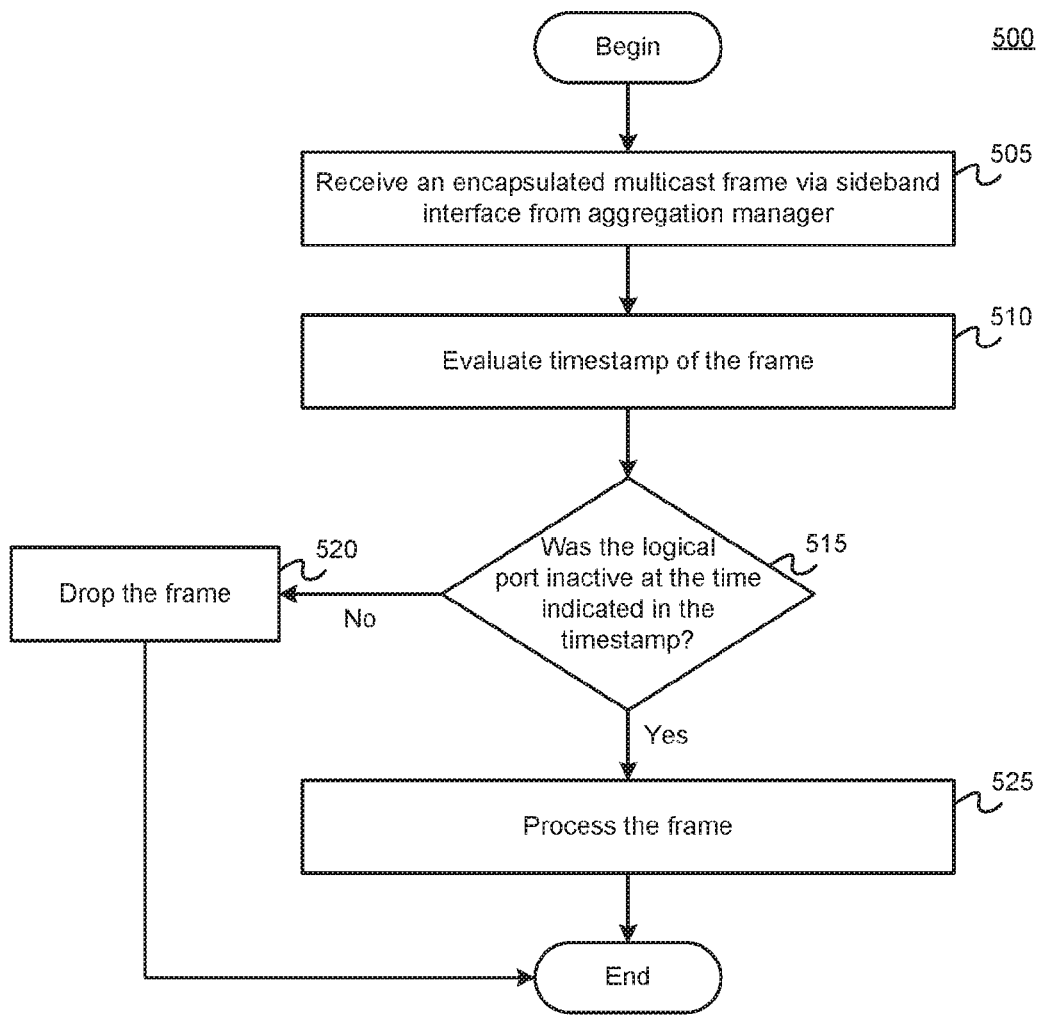
FIG. 5 illustrates a method for evaluating multicast frames forwarded by an aggregation manager, according to one embodiment.

FIG. 5 illustrates a method 500 for evaluating multicast (or broadcast) frames forwarded by an aggregation manager, according to one embodiment. As stated, the aggregation manager 317 may automatically forward multicast frames to the client OS instances intended to receive the frames via the sideband interfaces because of the relative infrequency that multicast frames are sent. In one embodiment, the promiscuous SR-IOV port receives a multicast frame, and the aggregation manager builds an encapsulated frame from the frame and the physical port associated with the frame. The aggregation manager forwards the encapsulated frame to all VMs having SR-IOV logical ports associated with the physical port, via a sideband interface that supports multicast.

Method 500 will be described using FIG. 3B as an example. As shown, method 500 begins at step 505, where the client OS receives the encapsulated multicast frame from the aggregation manager 317 via the sideband interface. The client OS extracts the multicast frame.

At step 510, the client OS evaluates the timestamp of the multicast frame. The timestamp indicates a point in time where the switch sent the multicast frame to the SR-IOV network adapter. At step 515, the client OS determines, based on the timestamp, whether the logical port was inactive during the time period that the frame was sent from the switch. If the logical port was active at the time that the multicast frame was sent, then at step 520, the client OS may drop the frame. For example, assume that the multicast frame was sent via port 2 323. As a result, the frame should have been sent to SR-IOV logical ports B 308 and D 313. Further, assume that the client OS is of VM Y 310. In this case, the multicast frame should have been delivered to the SR-IOV logical port D 313. The client OS may determine that the logical port D 313 was active when the frame was sent from the switch. Consequently, the client OS may drop the frame (as the client OS likely had already received the frame through the SR-IOV logical port D 313).

Otherwise, at step 525, the client OS processes the frame. Similar to the previous example, assume that the multicast frame was sent via port 2 323. Further, assume that the client OS is of VM X 305. In this case, the multicast frame should have been delivered to the SR-IOV logical port B 308. The client OS may determine that the logical port B 308 was inactive when the frame was sent from the switch. As a result, the client OS processes the frame.

Figure 6:
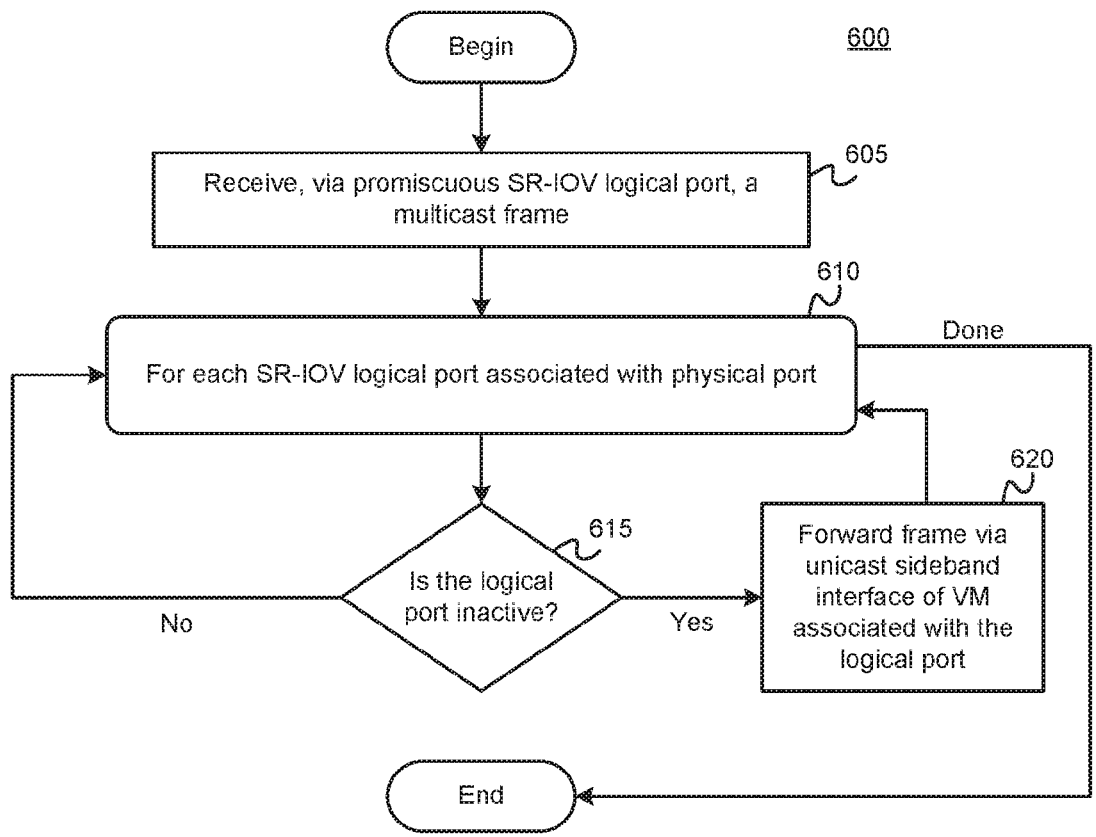
FIG. 6 illustrates a method for distributing a multicast frame via a unicast sideband interface, according to one embodiment.

In one embodiment, the aggregation manager is configured to directly track a live operational state of each logical port for the purpose of forwarding multicast frames to intended destinations. Doing so allows the aggregation manager to forward multicast frames to VMs determined to have an inactive logical port (without placing a burden on a VM with active logical ports that have already received a given multicast frame). FIG. 6 illustrates a method 600 for distributing a multicast frame via a unicast sideband interface. As shown, method 600 begins at step 605, where the aggregation manager receives a multicast frame via a promiscuous SR-IOV logical port associated with a physical port on the SR-IOV network adapter.

At step 610, the aggregation manager enters a loop for each SR-IOV logical port associated with the physical port, performing the following steps. At step 615, the aggregation manager determines whether the SR-IOV logical port is inactive. If not, then the aggregation manager evaluates the next SR-IOV logical port associated with the physical port. Otherwise, if the SR-IOV logical port is inactive, the aggregation manager forwards the frame via a unicast sideband interface to the VM that is associated with the inactive logical port (at step 620).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding description, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments presented herein. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments may be devised without departing from the basic scope thereof, and the scope thereof is determined by the claims that follow.

What is claimed is:

1. A computer-implemented method for providing Ethernet link aggregation for logically independent entities that share a plurality of physical ports, the method comprising:
   receiving a frame at a first logical port that receives frames targeted to at least a second logical port, wherein the second logical port is associated with a client operating system (OS) and wherein the first and second logical ports are assigned to a physical port of a network adapter, and wherein the frame is a unicast frame;
   determining whether the second logical port received the frame, wherein determining whether the second logical port received the frame comprises determining a live operational state of the second logical port, wherein the second logical port received the frame if, based on the live operational state, the second logical port is active; and
   upon determining that the second logical port did not receive the frame, forwarding the frame to the client OS via a sideband interface associated with the client OS.

2. The method of claim 1, further comprising, upon determining that the second logical port was active at the time based on the live operational state of the second logical port, dropping the frame received at the first logical port.

3. The method of claim 1, wherein the sideband interface is a virtual switch.

4. The method of claim 1, wherein the first and second logical ports correspond to virtual function instances of a single-root I/O virtualization (SR-IOV)-enabled network adapter.

5. A computer program product, comprising:
   a non-transitory computer-readable storage medium storing instructions, which, when executed on a processor, perform an operation for providing Ethernet link aggregation for logically independent entities that share a plurality of physical ports, the operation comprising:
      receiving a frame at a first logical port that receives frames targeted to at least a second logical port, wherein the second logical port is associated with a client operating system (OS) and wherein the first and second logical ports are assigned to a physical port of a network adapter, and wherein the frame is a unicast frame;
      determining whether the second logical port received the frame, wherein determining whether the second logical port received the frame comprises determining a live operational state of the second logical port, wherein the second logical port received the frame if, based on the live operational state, the second logical port is active; and upon determining that the second logical port did not receive the frame, forwarding the frame to the client OS via a sideband interface associated with the client OS.

6. The computer program product of claim 5, wherein the operation further comprises, upon determining that the second logical port was active at the time based on the live operational state of the second logical port, dropping the frame received at the first logical port.

7. The computer program product of claim 5, wherein the sideband interface is a virtual switch.

8. The computer program product of claim 5, wherein the first and second logical ports correspond to virtual function instances of a single-root I/O virtualization (SR-IOV)-enabled network adapter.

9. A system, comprising:
a processor;
a network adapter; and
a memory storing code, which, when executed on the processor, performs an operation for providing Ethernet link aggregation for logically independent entities that share a plurality of physical ports, the operation comprising:
receiving a frame at a first logical port that receives frames targeted to at least a second logical port, wherein the second logical port is associated with a client operating system (OS) and wherein the first and second logical ports are assigned to a physical port of a network adapter, and wherein the frame is a unicast frame;
determining whether the second logical port received the frame, wherein determining whether the second logical port received the frame comprises determining a live operational state of the second logical port, wherein the second logical port received the frame if, based on the live operational state, the second logical port is active; and
upon determining that the second logical port did not receive the frame, forwarding the frame to the client OS via a sideband interface associated with the client OS.

10. The system of claim 9, wherein the operation further comprises, upon determining that the second logical port was active at the time based on the live operational state of the second logical port, dropping the frame received at the first logical port.

11. The system of claim 9, wherein the sideband interface is a virtual switch.

12. A computer-implemented method for providing Ethernet link aggregation for logically independent entities that share a plurality of physical ports, the method comprising:
receiving a frame at a first logical port that receives frames targeted to at least a second logical port, wherein the second logical port is associated with a client operating system (OS) and wherein the first and second logical ports are assigned to a physical port of a network adapter, and wherein the frame is a multicast frame;
determining whether the second logical port received the frame, wherein determining whether the second logical port received the frame comprises determining, via the client OS, whether the second logical port was active at the time that the multicast frame was received; and upon determining that the second logical port did not receive the frame, forwarding the frame to the client OS via a sideband interface associated with the client OS.

13. The method of claim 12, wherein the sideband interface is a virtual switch.

14. The method of claim 12, further comprising, upon determining that the second logical port was active at the time that the multicast frame was received, dropping the frame received at the first logical port.

15. A computer program product, comprising:
a non-transitory computer-readable storage medium storing instructions, which, when executed on a processor, perform an operation for providing Ethernet link aggregation for logically independent entities that share a plurality of physical ports, the operation comprising:
receiving a frame at a first logical port that receives frames targeted to at least a second logical port, wherein the second logical port is associated with a client operating system (OS) and wherein the first and second logical ports are assigned to a physical port of a network adapter, and wherein the frame is a multicast frame;
determining whether the second logical port received the frame, wherein determining whether the second logical port received the frame comprises determining, via the client OS, whether the second logical port was active at the time that the multicast frame was received; and
upon determining that the second logical port did not receive the frame, forwarding the frame to the client OS via a sideband interface associated with the client OS.

16. The computer program product of claim 15, wherein the sideband interface is a virtual switch.

17. The computer program product of claim 15, wherein the operation further comprises, upon determining that the second logical port was active at the time that the multicast frame was received, dropping the frame received at the first logical port.

18. A system, comprising:
a processor;
a network adapter; and
a memory storing code, which, when executed on the processor, performs an operation for providing Ethernet link aggregation for logically independent entities that share a plurality of physical ports, the operation comprising:
receiving a frame at a first logical port that receives frames targeted to at least a second logical port, wherein the second logical port is associated with a client operating system (OS) and wherein the first and second logical ports are assigned to a physical port of a network adapter, and wherein the frame is a multicast frame;
determining whether the second logical port received the frame, wherein determining whether the second logical port received the frame comprises determining, via the client OS, whether the second logical port was active at the time that the multicast frame was received; and
upon determining that the second logical port did not receive the frame, forwarding the frame to the client OS via a sideband interface associated with the client OS.

19. The system of claim 18, wherein the sideband interface is a virtual switch.

20. The system of claim 18, wherein the operation further comprises, upon determining that the second logical port was active at the time that the multicast frame was received, dropping the frame received at the first logical port.

* * * * *